(12) United States Patent
Hoshi et al.

(10) Patent No.: US 12,269,455 B2
(45) Date of Patent: Apr. 8, 2025

(54) METHOD FOR CONTROLLING SERIES HYBRID VEHICLE, AND SERIES HYBRID VEHICLE

(71) Applicant: Nissan Motor Co., Ltd., Yokohama (JP)

(72) Inventors: Kiyoshi Hoshi, Kanagawa (JP); Hiroko Katayama, Kanagawa (JP); Azusa Kobayashi, Kanagawa (JP); Hiroyasu Fujita, Kanagawa (JP); Hiromu Morishita, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 672 days.

(21) Appl. No.: 17/628,930

(22) PCT Filed: Jul. 31, 2020

(86) PCT No.: PCT/JP2020/029524
§ 371 (c)(1),
(2) Date: Jan. 21, 2022

(87) PCT Pub. No.: WO2022/024373
PCT Pub. Date: Feb. 3, 2022

(65) Prior Publication Data
US 2022/0355786 A1 Nov. 10, 2022

(51) Int. Cl.
*B60W 20/14* (2016.01)
*B60W 10/08* (2006.01)

(52) U.S. Cl.
CPC ............ *B60W 20/14* (2016.01); *B60W 10/08* (2013.01); *B60W 2510/244* (2013.01); *B60W 2520/10* (2013.01); *B60W 2710/086* (2013.01)

(58) Field of Classification Search
CPC ................. B60W 20/14; B60W 10/10; B60W 2710/0666; B60W 20/30;
(Continued)

(56) References Cited

U.S. PATENT DOCUMENTS

| 5,476,310 A | * | 12/1995 | Ohtsu | ..................... B60L 7/003 303/3 |
| 6,459,980 B1 | * | 10/2002 | Tabata | .................... B60L 50/61 180/65.245 |

(Continued)

FOREIGN PATENT DOCUMENTS

| JP | 2013-82346 A | 5/2013 |
| JP | 2016-43908 A | 4/2016 |

(Continued)

*Primary Examiner* — Steven B Theriault
(74) *Attorney, Agent, or Firm* — Global IP Counselors, LLP (57) ABSTRACT

A series hybrid vehicle control method charges a battery with electric power generated by an electric power generation motor driven by an internal combustion engine, and electric power regenerated by a drive motor. The control method starts generating the electric power by the engine if a requested output exceeds a power generation start threshold value, and stops generating electric power by the engine if the requested output falls below a power generation stop threshold value. A deceleration rate by regeneration of the drive motor is greater in a second advancement shift position than in a first advancement shift position. The power generation start threshold value and/or the power generation stop threshold value where the second advancement shift position has been selected is greater than the power generation start threshold value or the power generation stop threshold value where the first advancement shift position has been selected.

6 Claims, 9 Drawing Sheets

(58) Field of Classification Search
CPC ........... B60W 30/18127; B60W 20/00; B60W 10/08; B60W 50/082; B60W 30/188; B60K 2006/4808; B60L 50/61; B60L 7/18; B60L 7/26; B60L 15/2045; B60L 58/13; B60L 7/10; B60L 2260/26
See application file for complete search history.

(56) References Cited

U.S. PATENT DOCUMENTS

| | | | | |
|---|---|---|---|---|
| 6,910,747 B2* | 6/2005 | Tsunehara | ............... | B60T 8/267 303/3 |
| 7,426,975 B2* | 9/2008 | Toyota | ............... | B60L 7/26 180/170 |
| 7,960,928 B2* | 6/2011 | Tang | ............... | B60L 15/2045 318/578 |
| 9,738,268 B1* | 8/2017 | Zhang | ............... | B60W 20/00 |
| 9,849,786 B2* | 12/2017 | Miller | ............... | B60W 20/00 |
| 11,708,806 B2* | 7/2023 | Kimura | ............... | F02D 41/0275 123/520 |
| 11,964,568 B2* | 4/2024 | Bolger | ............... | B60L 15/2009 |
| 2002/0062183 A1* | 5/2002 | Yamaguchi | ............... | B60K 6/543 903/905 |
| 2002/0190690 A1* | 12/2002 | Tamai | ............... | B60L 1/00 903/903 |
| 2003/0098185 A1* | 5/2003 | Komeda | ............... | B60W 10/08 903/917 |
| 2004/0070372 A1* | 4/2004 | Kawai | ............... | H02J 1/08 290/40 R |
| 2007/0080007 A1* | 4/2007 | Teramoto | ............... | H02P 9/02 307/10.1 |
| 2009/0157245 A1* | 6/2009 | Moon | ............... | B60W 30/18036 180/65.285 |
| 2010/0076657 A1* | 3/2010 | Jinno | ............... | B60K 6/445 180/65.265 |
| 2010/0090629 A1* | 4/2010 | Tang | ............... | B60L 15/2045 180/65.285 |
| 2010/0168946 A1* | 7/2010 | Snyder | ............... | H02P 6/182 701/22 |
| 2010/0217468 A1* | 8/2010 | Soma | ............... | B60L 15/2045 180/65.265 |
| 2011/0034282 A1* | 2/2011 | Akutsu | ............... | B60K 6/365 475/5 |
| 2013/0197735 A1* | 8/2013 | Ueno | ............... | F01N 3/0238 180/65.265 |
| 2013/0297121 A1* | 11/2013 | Reed | ............... | B60W 30/18118 180/65.265 |
| 2013/0307449 A1* | 11/2013 | Kobayashi | ............... | H02P 21/05 318/400.02 |
| 2015/0184743 A1* | 7/2015 | Eto | ............... | F16H 61/16 701/55 |
| 2015/0202966 A1* | 7/2015 | Oyama | ............... | B60L 3/0046 701/22 |
| 2015/0203106 A1* | 7/2015 | Zhao | ............... | B60L 15/2009 701/22 |
| 2016/0082842 A1* | 3/2016 | Perkins | ............... | B60L 15/2009 701/22 |
| 2016/0339906 A1* | 11/2016 | Nefcy | ............... | B60W 10/115 |
| 2017/0021822 A1* | 1/2017 | Endo | ............... | B60W 10/08 |
| 2017/0087992 A1* | 3/2017 | Murase | ............... | B60L 7/18 |
| 2017/0113675 A1* | 4/2017 | Oguri | ............... | B60W 10/26 |
| 2017/0291598 A1* | 10/2017 | Murase | ............... | B60W 20/40 |
| 2018/0106367 A1* | 4/2018 | Mouri | ............... | B60W 10/08 |
| 2018/0111601 A1 | 4/2018 | Kamatani | | |
| 2018/0201140 A1* | 7/2018 | Shimizu | ............... | B60T 1/10 |
| 2018/0244258 A1* | 8/2018 | Mouri | ............... | B60W 10/107 |
| 2018/0326956 A1* | 11/2018 | Zhu | ............... | B60T 17/22 |
| 2019/0049959 A1* | 2/2019 | Gaither | ............... | B60W 50/085 |
| 2019/0092316 A1* | 3/2019 | Yukawa | ............... | B60K 6/48 |
| 2019/0168761 A1* | 6/2019 | Ito | ............... | B60W 20/40 |
| 2019/0217849 A1* | 7/2019 | Kai | ............... | B60W 20/12 |
| 2019/0232789 A1* | 8/2019 | Kinoshita | ............... | F02D 29/02 |
| 2019/0301377 A1* | 10/2019 | Shibata | ............... | F02D 29/02 |
| 2020/0391722 A1* | 12/2020 | Fujita | ............... | F02D 41/045 |
| 2021/0155218 A1* | 5/2021 | Higuchi | ............... | B60W 10/08 |
| 2021/0237582 A1* | 8/2021 | Patel | ............... | B60T 13/745 |
| 2022/0048494 A1* | 2/2022 | Miura | ............... | B60W 10/08 |
| 2022/0080949 A1* | 3/2022 | Hagimoto | ............... | H02M 7/493 |
| 2022/0274477 A1* | 9/2022 | Tsukizaki | ............... | B60K 6/387 |

FOREIGN PATENT DOCUMENTS

| | | |
|---|---|---|
| JP | 2019-151283 A | 9/2019 |
| JP | 2019-163051 A | 9/2019 |
| WO | 2016/024053 A1 | 2/2016 |
| WO | 2019/116584 A1 | 6/2019 |
| WO | 2019/116586 A1 | 6/2019 |

* cited by examiner

METHOD FOR CONTROLLING SERIES HYBRID VEHICLE, AND SERIES HYBRID VEHICLE

CROSS-REFERENCE TO RELATED APPLICATIONS

This application is a U.S. national stage application of International Application No. PCT/JP2020/029524, filed on Jul. 31, 2020.

BACKGROUND

Technical Field

The present invention relates to a control for a series hybrid vehicle.

Background Information

JP 2016-43908 A discloses a hybrid vehicle in which a deceleration rate when an accelerator is off differs depending on a shift position. In this document, the deceleration rate when the accelerator is off is adjusted using braking force produced through regeneration of a motor. Regenerated electric power of differing magnitudes is set for each shift position.

SUMMARY

In configurations such as that in the document described above, regenerative electric power is high in a shift position at which a deceleration rate is high, and therefore a battery readily reaches a fully charged state during deceleration. Should the battery reach a fully charged state, regeneration would subsequently be restricted, and therefore it would become impossible to realize a high deceleration rate requested by a driver. Specifically, there is a concern that, in the configuration in the document described above, the deceleration rate could change between before and after the battery becomes fully charged, and a sense of discomfort could be imparted to the driver. Thus, an object of the present invention is to suppress any change in deceleration rate caused by an increase in a state of charge of a battery during deceleration.

According to a certain aspect of the present invention, there is provided a method for controlling a series hybrid vehicle in which: a battery is charged with electric power generated by an electric power generation motor, which is driven by motive power from an internal combustion engine, and with electric power regenerated by a drive motor, the electric power of the battery being used in driving of drive wheels by the drive motor; generation of electric power by the internal combustion engine is started if a vehicle requested output exceeds an electric power generation start threshold value, and generation of electric power by the internal combustion engine is stopped if the vehicle requested output falls below an electric power generation stop threshold value; and a deceleration rate produced through regeneration of the drive motor is greater in a second advancement shift position than in a first advancement shift position. The electric power generation start threshold value and/or the electric power generation stop threshold value in a case where the second advancement shift position has been selected is greater than the respective electric power generation start threshold value or electric power generation stop threshold value in a case where the first advancement shift position has been selected.

BRIEF DESCRIPTION OF THE DRAWINGS

Referring now to the attached drawings which form a part of this original disclosure.

DETAILED DESCRIPTION OF EMBODIMENTS

An embodiment of the present invention is described below with reference to the accompanying drawings.

Figure 1:
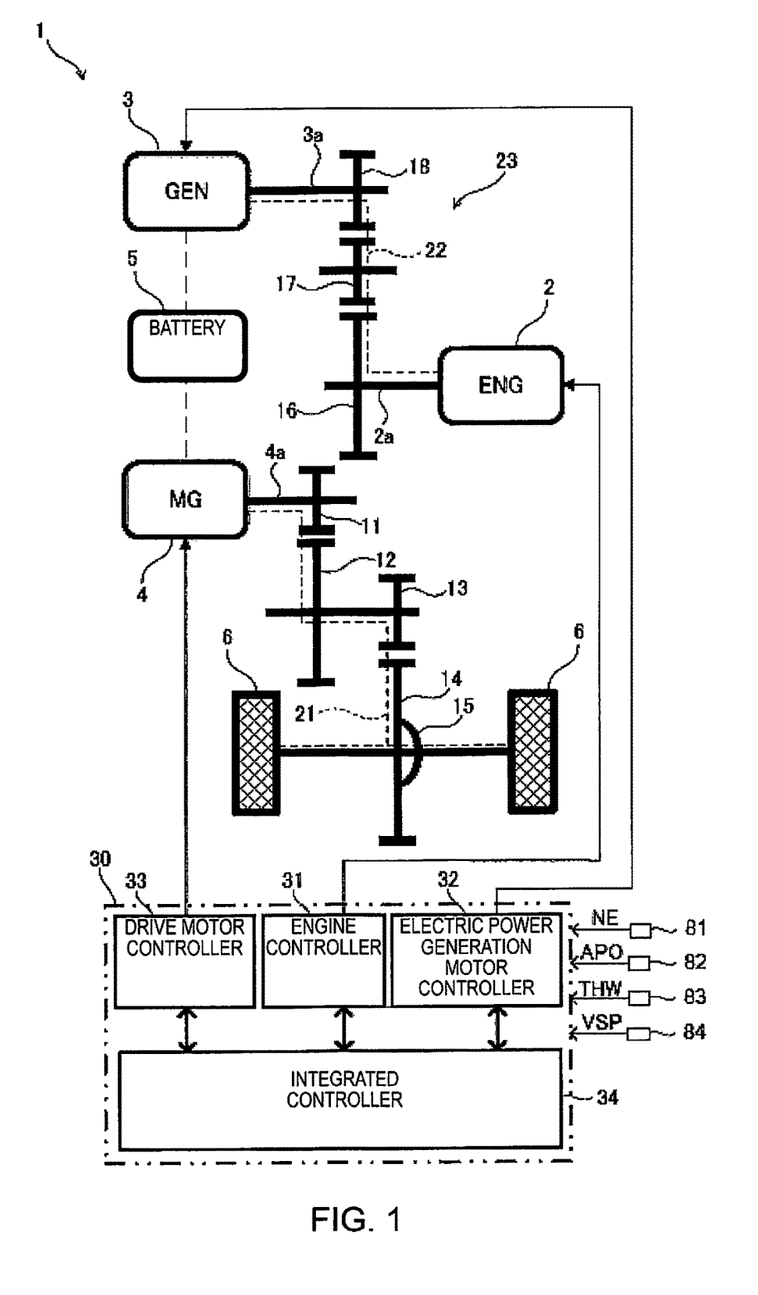
FIG. 1 is a schematic structural view showing main sections of a vehicle.

FIG. 1 is a schematic structural view showing main sections of a vehicle 1. The vehicle 1 comprises an internal combustion engine 2, an electric power generation motor 3, a drive motor 4, a battery 5, and drive wheels 6.

The internal combustion engine 2 may be either a gasoline engine or a diesel engine. The electric power generation motor 3 is driven by motive power of the internal combustion engine 2 to thereby generate electric power. The drive motor 4 is driven by electric power from the battery 5 and drives the drive wheels 6. The drive motor 4 also has a "regenerative function," in which the drive motor 4 co-rotates with the drive wheels 6 during deceleration, etc., whereby deceleration energy is regenerated as electric power. The battery 5 is charged by the electric power generated by the electric power generation motor 3 and the electric power regenerated by the drive motor 4.

The vehicle 1 has a first motive power transmission path 21 and a second motive power transmission path 22. The first motive power transmission path 21 transmits motive power between the drive motor 4 and the drive wheels 6. The second motive power transmission path 22 transmits motive power between the internal combustion engine 2 and the electric power generation motor 3. The first motive power transmission path 21 and the second motive power transmission path 22 are configured to be mutually independent of each other; specifically, motive power is not transmitted from the first motive power transmission path 21 to the second motive power transmission path 22 or vice versa.

The first motive power transmission path 21 is configured to have: a first reduction gear 11 provided to a rotating shaft 4a of the drive motor 4; a second reduction gear 12 that meshes with the first reduction gear 11; a third reduction gear 13 that is provided coaxially with the second reduction gear 12 and that meshes with a differential gear 14; and the differential gear 14, which is provided to a differential case 15.

The second motive power transmission path 22 is configured to have a fourth reduction gear 16 provided to an output shaft 2a of the internal combustion engine 2, a fifth reduction gear 17 that meshes with the fourth reduction gear 16, and a sixth reduction gear 18 that is provided to a rotating shaft 3a of the electric power generation motor 3 and that meshes with the fifth reduction gear 17.

Neither of the first motive power transmission path 21 and the second motive power transmission path 22 is provided with an element for obstructing transmission of motive power. Specifically, each of the first motive power transmission path 21 and the second motive power transmission path 22 is configured in a state in which motive power is always transmitted.

The second motive power transmission path 22 constitutes a motive power transmission path of a motive power transmission system 23. The motive power transmission system 23 includes the internal combustion engine 2 and the electric power generation motor 3 and is configured such that motive power is transmitted from the electric power generation motor 3 to the internal combustion engine 2 during motoring of the internal combustion engine 2.

The vehicle 1 is furthermore provided with a controller 30 that serves as a controller. The controller 30 is configured to have an engine controller 31 that controls the internal combustion engine 2, an electric power generation-motor controller 32 that controls the electric power generation motor 3, a travel-motor controller 33 that controls the drive motor 4, and a consolidating controller 34 that consolidates the control of the vehicle 1.

The engine controller 31 is configured from a microcomputer provided with a central processing unit (CPU), a read-only memory (ROM), a random access memory (RAM), and an input/output interface (I/O interface). The same applies to the electric power generation-motor controller 32, the travel-motor controller 33, and the consolidating controller 34. The engine controller 31, the electric power generation-motor controller 32, and the travel-motor controller 33 are communicably connected to each other by a CAN standard bus via the consolidating controller 34.

Signals from a variety of sensors and switches are inputted to the controller 30, the sensors and switches including a rotational speed sensor 81 for detecting a rotational speed NE of the internal combustion engine 2, an accelerator position sensor 82 for detecting an accelerator position APO that indicates the amount by which an accelerator pedal is depressed, a water temperature sensor 83 for detecting a water temperature THW of the internal combustion engine 2, and a vehicle speed sensor 84 for detecting a vehicle speed VSP. These signals are inputted to the consolidating controller 34 either directly or via the engine controller 31 or another controller.

The vehicle 1 constitutes a series hybrid vehicle that uses electric power from the electric power generation motor 3, which is driven by the motive power from the internal combustion engine 2 and which generates electric power, to drive the drive wheels 6 using the drive motor 4.

Figure 2:
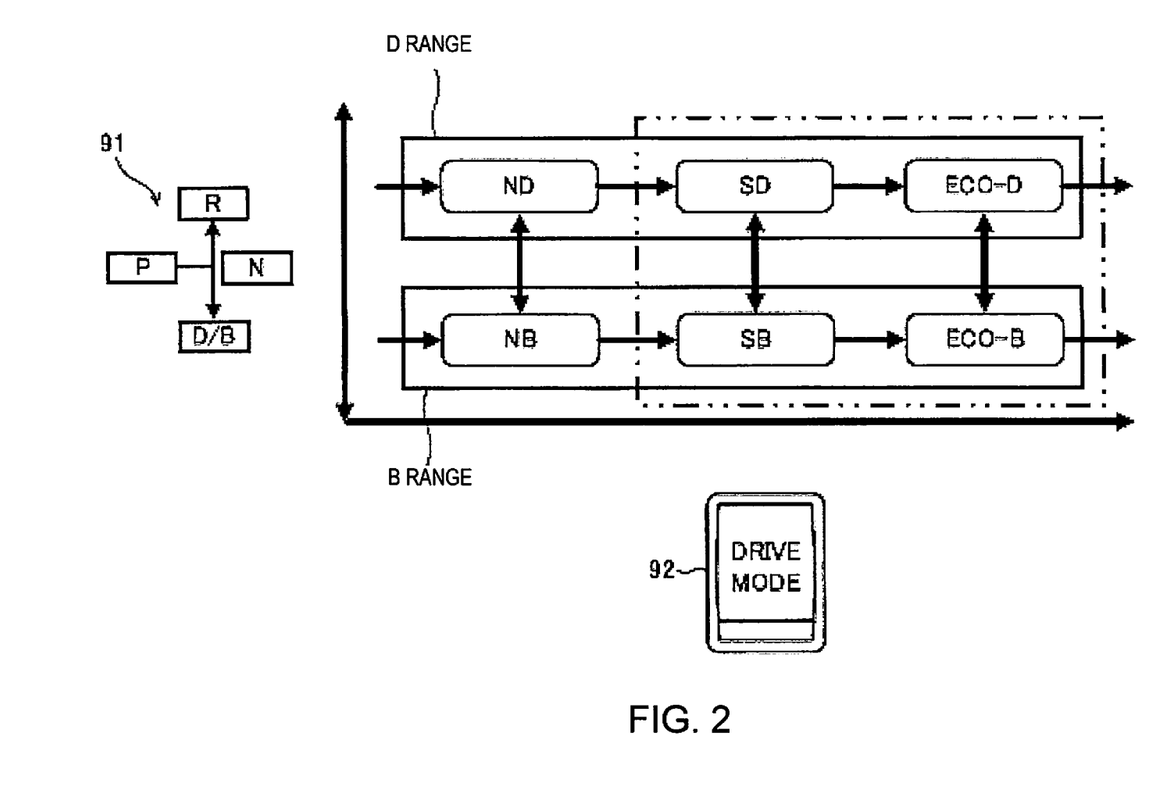
FIG. 2 is a diagram for elucidating shift positions and drive modes.

FIG. 2 is a diagram for elucidating shift positions and drive modes. The vehicle 1 has a shifter 91. The shifter 91 is a device for switching shift positions according to a driver operation. The driver operation is performed through operation of a shift lever or a switch to a gate that corresponds to each shift position.

The shifter 91 is configured as a momentary shifter. In the momentary shifter 91, a shift lever that has been released from the driver operation autonomously returns to a home position. The shift position selected according to the driver operation is displayed, together with a drive mode (described later), on a shift position display provided inside a vehicle compartment. The shift position display enables visual recognition of the selected shift position.

The shift positions that can be selected by the shifter 91 include D, which is a first advancement position, and B, which is a second advancement position, in addition to P (parking position), R (reverse position), and N (neutral position).

D and B are selected through a shift lever operation to a shared D/B gate. B is selected through the shift lever operation to the D/B gate in cases where D has been selected, and D is selected through the shift lever operation to the D/B gate in cases where B has been selected. In cases where a shift position other than D and B has been selected, D is selected through the shift lever operation to the D/B gate. D and B are further described below.

The vehicle 1 has a drive mode switch 92. The drive mode switch 92 is a switch for changing the drive mode according to a driver operation.

The drive modes include N mode, S mode, and ECO mode. In N mode, acceleration is carried out through an accelerator pedal operation (normal regeneration mode). Therefore, in N mode, regenerative deceleration is not carried out while the accelerator pedal is being operated, and regenerative deceleration is carried out when the accelerator pedal is in an off state. In S mode and ECO mode, acceleration and regenerative deceleration are carried out through the accelerator pedal operation (one-pedal modes). ECO mode is more suitable for fuel-efficient driving than S mode. The drive modes are changed between N mode, S mode, and ECO mode in order when the drive mode switch 92 is pressed. A return is made to N mode following ECO mode.

Depending on a combination with the selected drive mode in the vehicle 1, D constitutes ND mode in combination with N mode, SD mode in combination with S mode, or ECO-D mode in combination with ECO mode. Similarly, depending on the combination with the selected drive mode, B constitutes NB mode, SB mode, or ECO-B mode.

The deceleration rate of the vehicle 1 caused by regeneration in the drive motor 4 when the accelerator pedal is in the off state is higher in the B position than in the D position. Specifically, a target deceleration rate is set so as to be higher in the B position than in the D position. A higher deceleration rate implies that the degree of deceleration is greater (absolute value of the deceleration rate is higher). The same applies to the target deceleration rate. An absolute value of regenerative electric power produced by the drive motor 4 is higher in the B position than in the D position, resulting in a higher deceleration rate. In addition, the regenerative electric power produced by the drive motor 4 when the accelerator pedal is in the off state is greater in both SD mode and ECO-D mode than in ND mode, resulting in a higher deceleration rate. In the descriptions given below, N mode is referred to as a normal regeneration mode, and S mode and ECO mode are referred to as enhanced regeneration modes.

Figure 3:
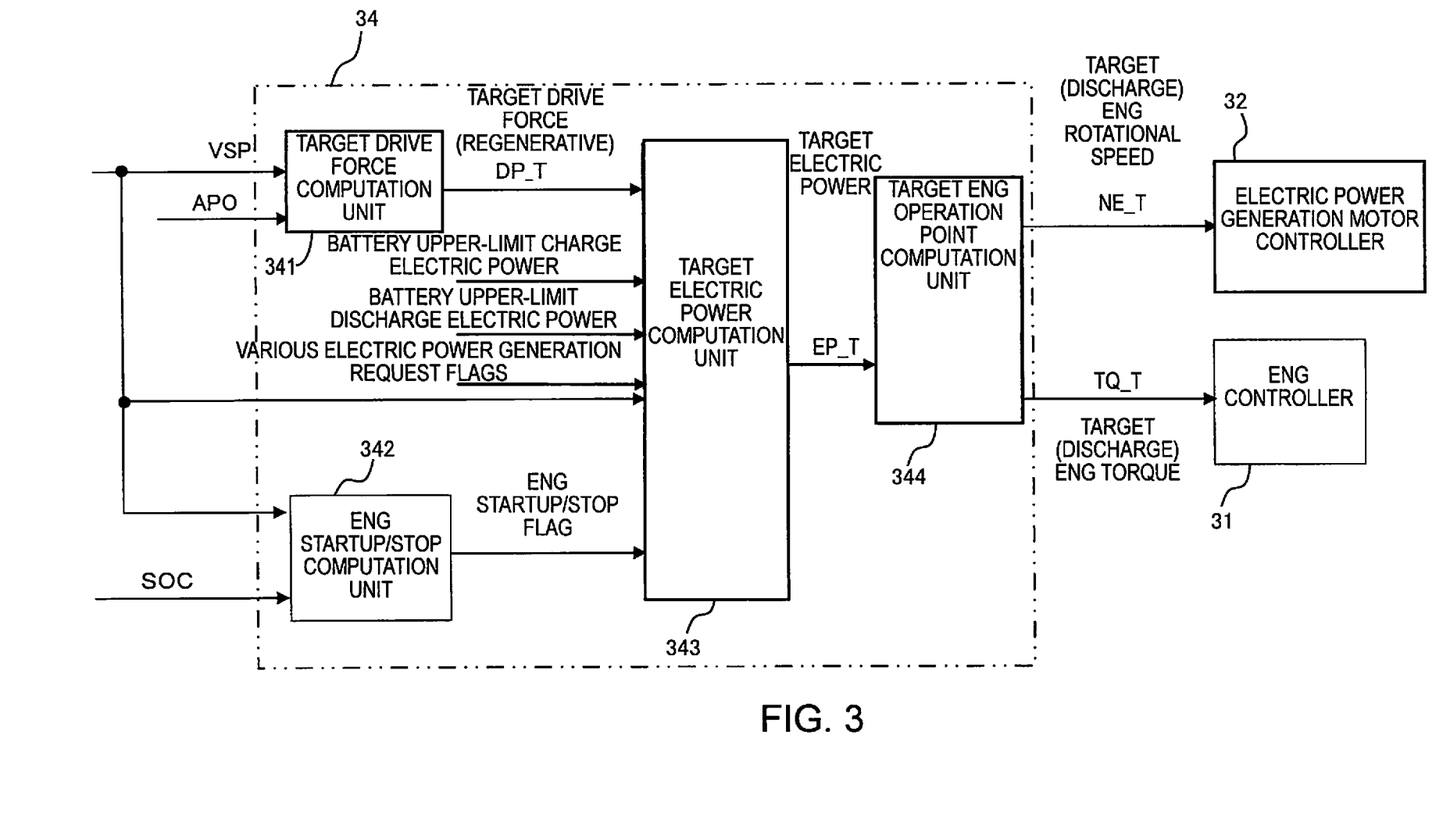
FIG. 3 is a block diagram showing process of consolidating controller.

FIG. 3 is a block diagram showing a processing function of the consolidating controller 34. FIG. 3 shows a process for computing a target engine rotational speed NE_T and a target engine torque TQ_T. The consolidating controller 34 has a target drive force computation unit 341, an engine startup/stop computation unit 342, a target electric power computation unit 343, and a target ENG operation point computation unit 344. These computation units indicate computation processing functions, and do not refer to physical configurations. The same applied to FIGS. 4 and 5 (described later).

The target drive force computation unit 341 computes a target drive force DP_T of the drive motor 4 on the basis of the vehicle speed VSP and the accelerator position APO. The target drive force DP_T can be set in advance in accordance with the vehicle speed VSP and the accelerator position APO. A negative target drive force DP_T, i.e., a target regenerative motive power, is computed by the target drive force computation unit 341 during regeneration. The computed target drive force DP_T is inputted to the target electric power computation unit 343. The target drive force DP_T is also inputted to the travel-motor controller 33, although this relationship is not shown in FIG. 3. The travel-motor controller 33 controls drive torque of the drive motor 4 on the basis of the target drive force DP_T.

The engine startup/stop computation unit 342: discerns, on the basis of the vehicle speed VSP and a state of charge SOC of the battery 5, whether the internal combustion engine 2 is to be started up or to be stopped; sets an engine startup flag in cases where the internal combustion engine 2 is to be started up; and sets an engine stop flag in cases where the internal combustion engine 2 is to be stopped. Both of these flags are inputted to the target electric power computation unit 343. The computations performed by the engine startup/stop computation unit 342 are described in greater detail later.

The target electric power computation unit 343 computes, on the basis of the target drive force DP_T, a target electric power EP_T for electric power generation or discharging by the electric power generation motor 3. In electric power generation, the electric power generation motor 3 is driven by the internal combustion engine 2; in discharging, the internal combustion engine 2 is driven by the electric power generation motor 3, i.e., motoring is carried out. However, the electric power generation motor 3 is not driven by the internal combustion engine 2 in cases where the engine stop flag is inputted from the engine startup/stop computation unit 342.

In cases where a positive target drive force DP_T is inputted, a target electric power EP_T for electric power generation is computed by the target electric power computation unit 343. The target electric power EP_T for electric power generation is corrected according to, inter alia, addition of electric power corresponding to various electric power generation request flags. The target electric power EP_T for electric power generation is computed with an upper-limit charging electric power being used as an upper limit.

In cases where a negative target drive force DP_T is inputted, a target electric power EP_T for discharge is computed by the target electric power computation unit 343. The target electric power EP_T for discharge is computed with an upper-limit discharging electric power as an absolute value being used as an upper limit. The computed target electric power EP_T is inputted to the target ENG operation point computation unit 344.

The target ENG operation point computation unit 344 computes a target operation point of the internal combustion engine 2 on the basis of the target electric power EP_T. The target operation point can be set in advance using map data that corresponds to the target electric power EP_T. In cases of discharging, i.e., motoring, a target rotational speed NE_T and a target torque TQ_T are computed by the target ENG operation point computation unit 344 as the target action point. The computed target rotational speed NE_T and the target torque TQ_T are inputted to the electric power generation-motor controller 32 and the engine controller 31, respectively.

The engine controller 31 controls the internal combustion engine 2 on the basis of the inputted target torque TQ_T. The electric power generation-motor controller 32 controls the electric power generation motor 3 on the basis of the inputted target rotational speed NE_T. Motoring of the internal combustion engine 2 is thereby carried out, and electric power is consumed.

The computations performed by the engine startup/stop computation unit 342 are described next with reference to FIGS. 4 and 5.

Because the regenerative electric power during deceleration in the B position is greater than that during deceleration in a normal regeneration mode in the D position, the rate of increase in the state of charge SOC is also higher. The state of charge SOC has an upper limit at which charging is possible, and the regenerative electric power is necessarily reduced when the upper limit is reached during deceleration. For example, in cases where the state of charge SOC is higher than a prescribed value, the target drive force computation unit 341 reduces the negative target drive force DP_T, i.e., the target regenerative motive power, during regeneration. "Reducing" refers to bringing the value closer to zero. The prescribed value described above is set to, e.g., 80%.

Specifically, there is a concern that the deceleration rate could decrease when the state of charge SOC reaches the upper limit, even in cases where the driver has requested a high deceleration rate and selected B, and that a sense of discomfort could be imparted to the driver. In particular, when electric power generation is executed, due to a driver having requested a high target drive force or due to the state of charge SOC being equal to or less than the prescribed value, through a control such as a state-of-charge control for starting up the internal combustion engine 2 and initiating electric power generation or an electric power generation control that is based on various electric power generation requests, the rate of increase in the state of charge SOC increases.

Thus, the consolidating controller 34 in the present embodiment performs a control so as to reduce the chance that electric power generation by the internal combustion engine 2 will be executed in cases where B is selected to a greater extent than in cases where D is selected, in order to suppress any increase in the state of charge SOC. Specifically, in cases where B is selected, the consolidating controller 34 makes it more difficult for the internal combustion engine 2 to start up, and makes it easier for the internal combustion engine 2 to stop, than when D is selected. Specifically, the engine startup/stop computation unit 342 sets a threshold value for assessment of startup or stopping on the basis of the shift position and the mode, compares the threshold value and a vehicle requested output to discern whether the internal combustion engine 2 is to be started up or to be stopped, and inputs the result of discernment to the target electric power computation unit 343. The vehicle requested output is an output required in order to cause the vehicle to travel in accordance with a request of the driver. The present embodiment illustrates a case where the electric power (also referred to as a target drive electric power below) required by the drive motor 4 in order to realize the target drive force DP_T described above is employed as the vehicle requested output.

Startup Assessment

Figure 4:
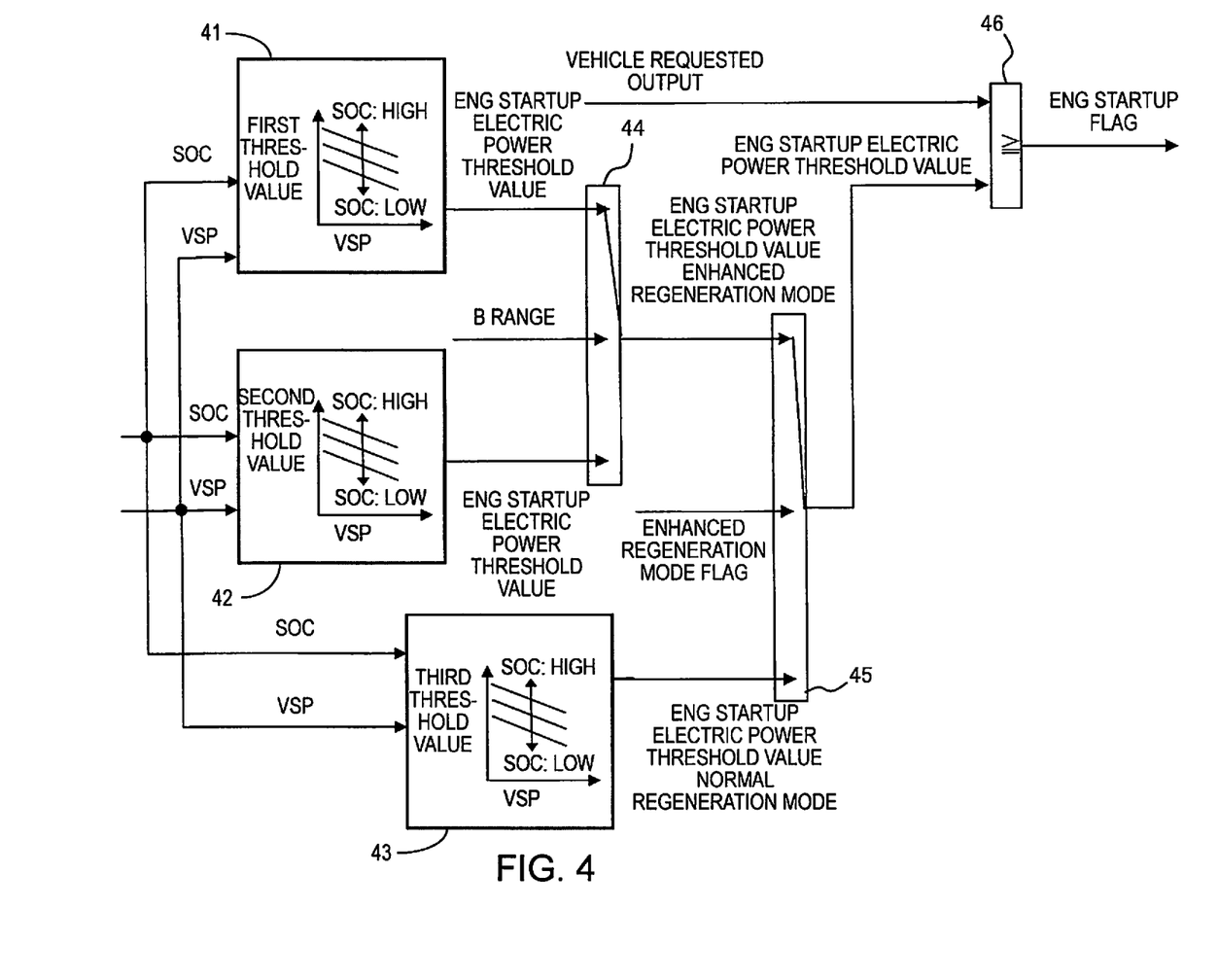
FIG. 4 is a block diagram of engine startup assessment.

FIG. 4 is a block diagram showing a processing function for discerning whether the internal combustion engine 2 is to be started up, said function being executed by the engine startup/stop computation unit 342.

A startup first threshold value computation unit 41 calculates a startup first threshold value on the basis of the vehicle speed VSP and the state of charge SOC. The startup first threshold value is a threshold value for assessing whether the internal combustion engine 2 is to be started up in cases where B has been selected. Specifically, in cases where B has been selected, the internal combustion engine 2 is started up once the vehicle requested output is equal to or greater than the startup first threshold value.

The startup first threshold value is mapped in advance and is stored in the consolidating controller 34. The startup first threshold value is set to a value that is lower for a higher vehicle speed VSP than for a lower vehicle speed VSP given the same state of charge SOC, and moreover is set to a value that is higher for a higher state of charge SOC given the same vehicle speed VSP. The startup first threshold value is set higher for a higher state of charge SOC in cases with the same vehicle speed VSP in order to make it more difficult for the internal combustion engine 2 to be started up as the state of charge SOC increases, i.e., as the state of charge SOC approaches the upper limit at which charging is possible. The characteristics in cases with the same state of charge SOC are described later. The calculated startup first threshold value is inputted to a first switch 44.

The map depicted for the startup first threshold value computation unit 41 in FIG. 4 shows an overview of characteristics of the startup first threshold value; more specific characteristics are described later. The same applies to maps for a startup second threshold value computation unit 42 and a startup third threshold value computation unit 43 described below.

The startup second threshold value computation unit 42 calculates a startup second threshold value on the basis of the vehicle speed VSP and the state of charge SOC, in the same manner as the startup first threshold value computation unit 41. The startup second threshold value is a threshold value for assessing whether the internal combustion engine 2 is to be started up in an enhanced regeneration mode in the D position. The characteristics of the startup second threshold value are basically the same as those of the startup first threshold value, but the magnitudes thereof at the same vehicle speed VSP and the same SOC are different. This matter is described later. The calculated startup second threshold value is inputted to the first switch 44.

The first switch 44 selects the startup first threshold value if a B flag has been inputted, and selects the startup second threshold value if no B flag has been inputted. The B flag is a flag inputted in cases where B has been selected. The threshold value selected in this instance is inputted to a second switch 45.

The startup third threshold value computation unit 43 calculates a startup third threshold value on the basis of the vehicle speed VSP and the state of charge SOC, in the same manner as the startup first threshold value computation unit 41 and the startup second threshold value computation unit 42. The startup third threshold value is a threshold value for assessing whether the internal combustion engine 2 is to be started up in a normal regeneration mode in the D position. The characteristics of the startup third threshold value are basically the same as those of the startup first threshold value and the startup second threshold value, but the magnitudes thereof at the same vehicle speed VSP and the same SOC are different. This matter is described later. The calculated startup third threshold value is inputted to the second switch 45.

The second switch 45 selects the threshold value selected by the first switch 44 if an enhanced regeneration mode flag has been inputted, and selects the startup third threshold value if no enhanced regeneration mode flag has been inputted. The enhanced regeneration mode flag is a flag inputted in cases of SD mode or ECO-D mode. The selected threshold value is inputted to a startup assessment unit 46.

The startup assessment unit 46 compares the threshold value selected by the second switch 45 and the vehicle requested output, and, in cases where the vehicle requested output is equal to or greater than the threshold value, inputs an engine startup flag to the target electric power computation unit 343.

Figure 6:
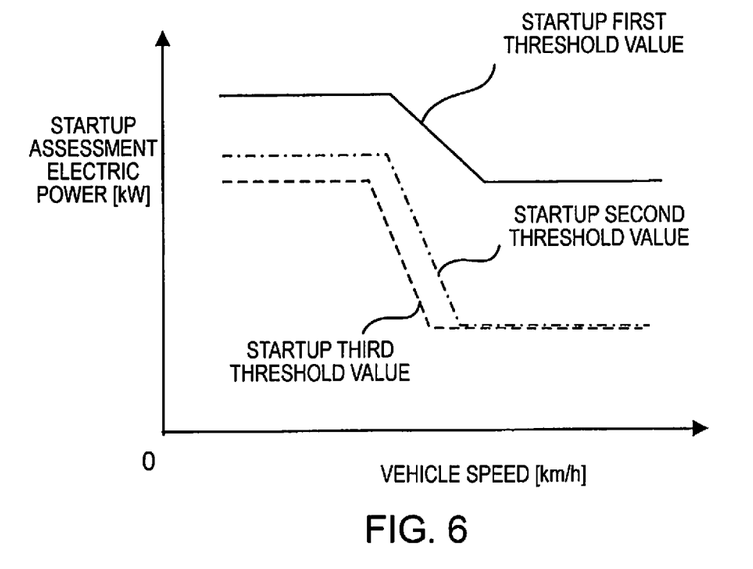
FIG. 6 is a diagram showing magnitude relationship between startup threshold values.

The magnitude relationship between the startup first threshold value, the startup second threshold value, and the startup third threshold value is described next. FIG. 6 shows the startup first threshold value, the startup second threshold value, and the startup third threshold value at the same state of charge SOC, with a horizontal axis representing the vehicle speed VSP, and a vertical axis representing the electric power (startup assessment electric power) that is the threshold value. All of these threshold values are greater for a lower vehicle speed VSP than for a higher vehicle speed VSP. These values also are fixed in a low-vehicle-speed region and in a high-vehicle-speed region, the values decreasing as the vehicle speed increases within an intermediate-vehicle-speed region.

These characteristics are employed in order to prevent propagation of engine noise, as much as possible, to passengers in the vehicle during electric power generation. Specifically, in situations in which engine noise stands out, such as during travel in built-up areas, the threshold value is increased to thereby make it more difficult for the engine to start up. However, in high-vehicle-speed regions, the requested electric power of the drive motor 4 is high, and the engine noise does not readily stand out due to high amounts of road noise, wind noise, etc.; therefore, the threshold value is reduced over that in the low-vehicle-speed region, the threshold value being reduced as the vehicle speed increases.

In the low- and intermediate-vehicle-speed regions, the startup first threshold value is greater than the startup second threshold value, which in turn is greater than the startup third threshold value. In the high-vehicle-speed region, the startup first threshold value is greater than the startup second threshold value, which is equal to the startup third threshold value. This is because the rate of increase in the state of charge SOC increases as the deceleration rate increases, therefore making it more difficult for the internal combustion engine 2 to be started up as the deceleration rate increases.

The characteristics shown in FIG. 6 are one example, but the present invention is not limited to the example shown in FIG. 6, provided that the threshold values are higher in a low-vehicle-speed region than in a high-vehicle-speed region. For example, characteristics may be employed such that the threshold values decrease at a fixed slope from the low-vehicle-speed region to the high-vehicle-speed region, as shown in FIG. 4. In addition, the threshold values may have the same magnitude in the low- and high-vehicle-speed regions, provided that the relationship in which the startup first threshold value is greater than the startup second threshold value, which in turn is greater than the startup third threshold value, is satisfied.

As described above, the consolidating controller 34 switches between the startup first threshold value, the startup second threshold value, or the startup third threshold value in accordance with a current travel shift position and travel mode, and assesses whether the internal combustion engine 2 is to be started up. This makes it more difficult for the internal combustion engine 2 to start up as the deceleration rate increases, and makes it possible to suppress any increase in the state of charge SOC.

Stop Assessment

Figure 5:
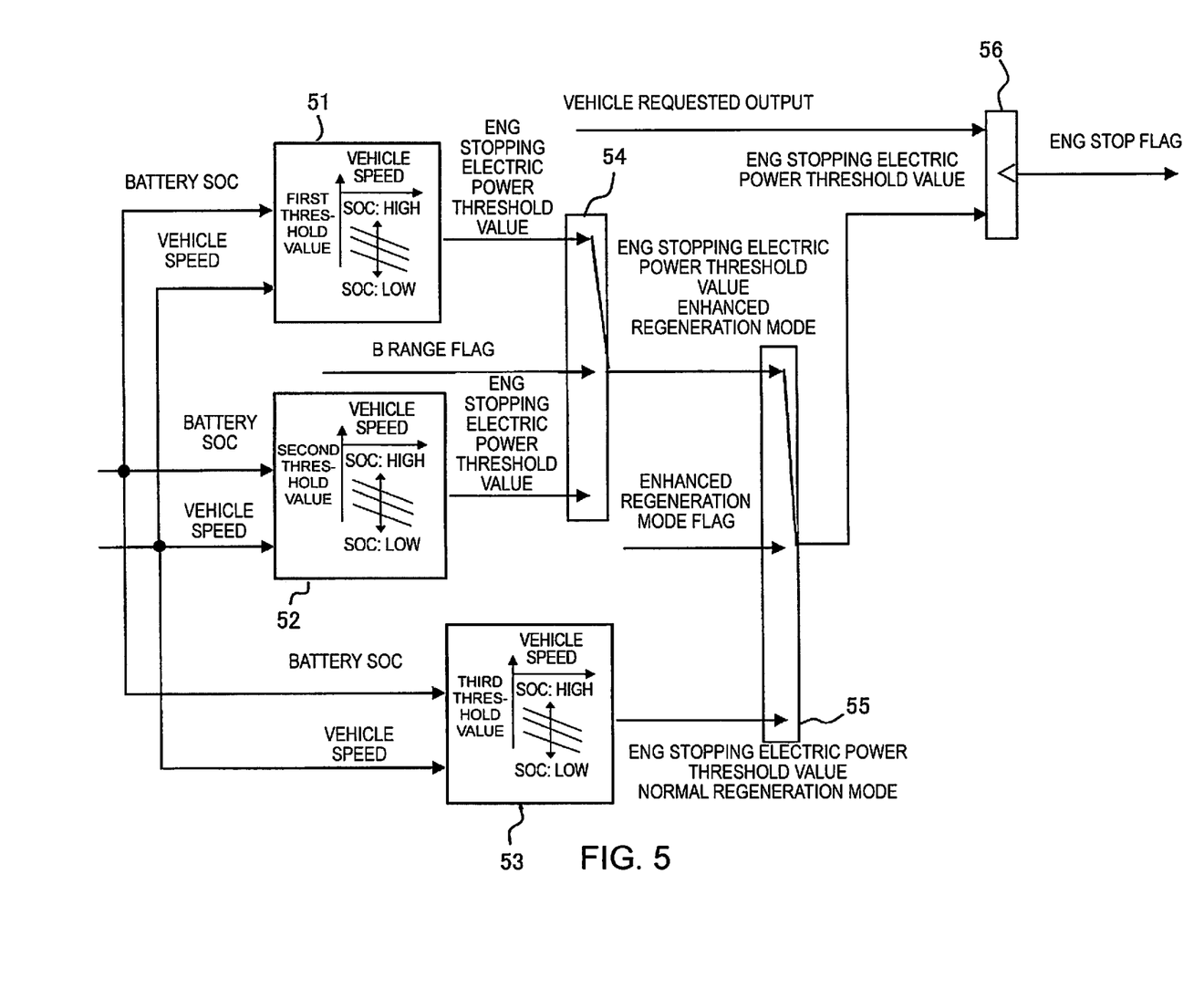
FIG. 5 is a block diagram of engine stop assessment.

FIG. 5 is a block diagram showing a processing function for discerning whether the internal combustion engine 2 is to be stopped, said function being executed by the engine startup/stop computation unit 342.

In FIG. 5, the startup first threshold value computation unit 41 from FIG. 4 is changed to a stopping first threshold value computation unit 51, the startup second threshold value computation unit 42 from FIG. 4 is changed to a stopping second threshold value computation unit 52, the startup third threshold value computation unit 43 from FIG. 4 is changed to a stopping third threshold value computation unit 53, and the startup assessment unit 46 from FIG. 4 is changed to a stopping assessment unit 56.

The stopping first threshold value computation unit 51 calculates the stopping first threshold value on the basis of the vehicle speed VSP and the state of charge SOC. The stopping first threshold value is a threshold value for assessing whether the internal combustion engine 2 is to be stopped in cases where B has been selected. Specifically, in cases where B has been selected, the internal combustion engine 2 is stopped once the vehicle requested output is less than the stopping first threshold value.

The stopping first threshold value is mapped in advance and is stored in the consolidating controller 34. The stopping first threshold value is set to a value that is lower for a higher vehicle speed VSP than for a lower vehicle speed VSP given the same state of charge SOC, and moreover is set to a value that is higher for a higher state of charge SOC given the same vehicle speed VSP. The stopping first threshold value is set higher for a higher state of charge SOC in cases with the same vehicle speed VSP in order to make it easier for the internal combustion engine 2 to be stopped as the state of charge SOC increases, i.e., as the state of charge SOC approaches the upper limit at which charging is possible. The characteristics in cases with the same state of charge SOC are described later. The calculated stopping first threshold value is inputted to a first switch 54.

The map depicted for the stopping first threshold value computation unit 51 in FIG. 5 shows an overview of characteristics of the stopping first threshold value; more specific characteristics are described later. The same applies to maps for a stopping second threshold value computation unit 52 and a stopping third threshold value computation unit 53 described below.

The stopping second threshold value computation unit 52 calculates a stopping second threshold value on the basis of the vehicle speed VSP and the state of charge SOC, in the same manner as the stopping first threshold value computation unit 51. The stopping second threshold value is a threshold value for assessing whether the internal combustion engine 2 is to be stopped in an enhanced regeneration mode in the D position. The characteristics of the stopping second threshold value are basically the same as those of the stopping first threshold value, but the magnitudes thereof at the same vehicle speed VSP and the same SOC are different. This matter is described later. The calculated stopping second threshold value is inputted to the first switch 54.

The first switch 54 selects the stopping first threshold value if a B flag has been inputted, and selects the stopping second threshold value if no B flag has been inputted.

The stopping third threshold value computation unit 53 calculates a stopping third threshold value on the basis of the vehicle speed VSP and the state of charge SOC, in the same manner as the stopping first threshold value computation unit 51 and the stopping second threshold value computation unit 52. The stopping third threshold value is a threshold value for assessing whether the internal combustion engine 2 is to be stopped in a normal regeneration mode in the D position. The characteristics of the stopping third threshold value are basically the same as those of the stopping first threshold value and the stopping second threshold value, but the magnitudes thereof at the same vehicle speed VSP and the same SOC are different. This matter is described later. The calculated stopping third threshold value is inputted to a second switch 55.

The second switch 55 selects the threshold value selected by the first switch 54 if an enhanced regeneration mode flag has been inputted, and selects the stopping third threshold value if no enhanced regeneration mode flag has been inputted. The selected threshold value is inputted to the stopping assessment unit 56.

The stopping assessment unit 56 compares the threshold value selected by the second switch 55 and the vehicle requested output, and, in cases where the vehicle requested output is less than the threshold value, inputs an engine stop flag to the target electric power computation unit 343.

Figure 7:
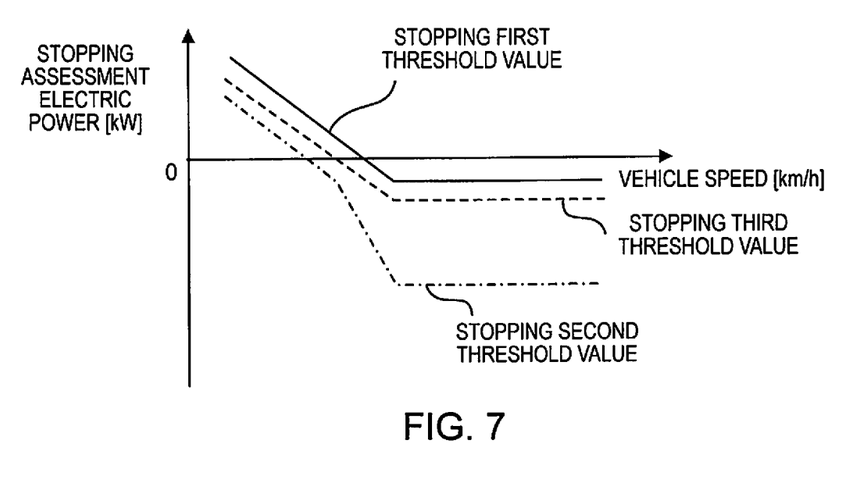
FIG. 7 is a diagram showing magnitude relationship between stopping threshold values.

The magnitude relationship between the stopping first threshold value, the stopping second threshold value, and the stopping third threshold value is described next. FIG. 7 shows the stopping first threshold value, the stopping second threshold value, and the stopping third threshold value at the same state of charge SOC, with a horizontal axis representing the vehicle speed VSP, and a vertical axis representing the electric power (stopping assessment electric power) that is the threshold value. All of these threshold values are greater for a lower vehicle speed VSP than for a higher vehicle speed VSP. These values also are fixed in an intermediate-vehicle-speed region and in a high-vehicle-speed region.

These characteristics are employed in order to prevent propagation of engine noise, as much as possible, to passengers in the vehicle during electric power generation. Specifically, in situations in which engine noise stands out, such as during travel in built-up areas, it is made easier for the engine to stop. However, in high-vehicle-speed regions, the requested electric power of the drive motor 4 is high, and the engine noise stands out less with higher amounts of road noise, wind noise, etc.; therefore, the threshold value is reduced over that in the low-vehicle-speed region, increasing the chance for electric power generation.

The magnitude relationship between the stopping threshold values is such that the stopping first threshold value is greater than the stopping third threshold value, which in turn is greater than the startup second threshold value. This is because the rate of increase in the state of charge SOC increases as the deceleration rate increases, therefore making it easier for the internal combustion engine 2 to be stopped when in the B position with a comparatively high deceleration rate than in the D position with a comparatively low deceleration rate.

The characteristics shown in FIG. 7 are one example, but the present invention is not limited to the example shown in FIG. 7, provided that the threshold values are higher in a low-vehicle-speed region than in a high-vehicle-speed region. For example, characteristics may be employed such that the threshold values decrease at a fixed slope from the low-vehicle-speed region to the high-vehicle-speed region, as shown in FIG. 5. In addition, the threshold values may have the same magnitude in the low- and high-vehicle-speed regions, provided that the relationship in which the stopping first threshold value is greater than the stopping third threshold value, which in turn is greater than the stopping second threshold value, is satisfied.

As described above, the consolidating controller 34 switches between the stopping first threshold value, the stopping second threshold value, or the stopping third threshold value in accordance with a current travel shift position and travel mode, and assesses whether the internal combustion engine 2 is to be stopped. This makes it easier for the internal combustion engine 2 to stop as the deceleration rate increases, and makes it possible to suppress any increase in the state of charge SOC.

Figure 8:
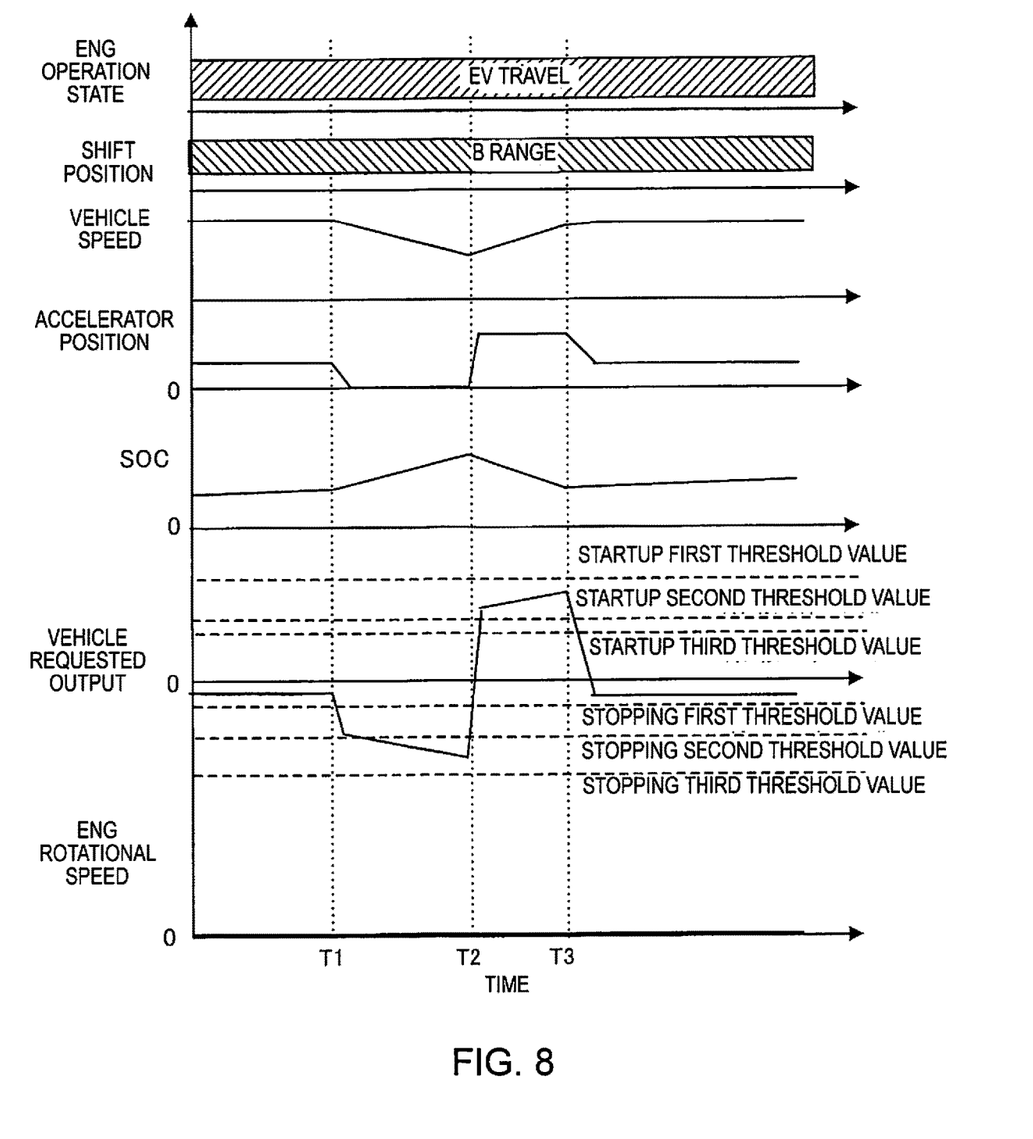
FIG. 8 is a timing chart for a case involving travel while in a B position.

FIG. 8 is a timing chart for a case involving travel in a high-vehicle-speed region while in the B position. Until a timing T1, the internal combustion engine 2 is in a stopped state and the vehicle 1 travels at a fixed speed; at the timing T1, the accelerator pedal position begins to decrease and then reaches zero. Specifically, from the timing T1, the vehicle requested output decreases, and the state of charge SOC increases due to deceleration regeneration.

When the accelerator pedal is depressed in order to resume acceleration at a timing T2, the vehicle requested output increases and the state of charge SOC decreases. In this instance, the internal combustion engine 2 does not start up because the vehicle requested output does not reach the startup first threshold value. This makes it possible to suppress any further increase in the state of charge SOC. Subsequent to a timing T3, the accelerator pedal position decreases to the same magnitude as that prior to the timing T1, and the vehicle requested output also decreases in association with this change. Specifically, according to the present embodiment, the internal combustion engine 2 does not start up during the period shown in FIG. 8.

Should the startup first threshold value for use in the B position be set higher than the startup second threshold value and the startup third threshold value for use in the D position, the internal combustion engine 2 would start up immediately after the timing T2, when the vehicle requested output has exceeded the startup second threshold value and the startup third threshold value, and electric power generation would be started. Thus, there is a concern that the state of charge SOC could further increase. Even after the accelerator pedal position has become fixed subsequent to the timing T3, the vehicle requested output would be greater than the stopping third threshold value, and therefore the internal combustion engine 2 would not stop. Thus, there is a concern that when deceleration is then carried out, the state of charge SOC could reach the upper limit partway through deceleration.

However, in the present embodiment, because the internal combustion engine 2 does not start up during the period shown in FIG. 8, as described above, it is possible to suppress any increase in the state of charge SOC. This makes it possible to suppress the possibility that the deceleration rate will change due to the state of charge SOC having reached the upper limit partway through deceleration.

Should the internal combustion engine 2 have operated prior to the timing T1, the internal combustion engine 2 will not stop if the stopping threshold value for use in the B position is equal to the stopping second threshold value for use in the enhanced regeneration mode in the D position; therefore, the rate of increase in the state of charge SOC would be greater than that in the case shown in FIG. 8. However, in the present embodiment, the internal combustion engine 2 stops subsequent to the timing T1 because the stopping first threshold value that is greater than the stopping second threshold value has been provided. This makes is possible to suppress any increase in the state of charge SOC.

First Modification

A modification pertaining to the stopping threshold values is described next. The present modification is also included in the scope of the present invention.

Figure 9:
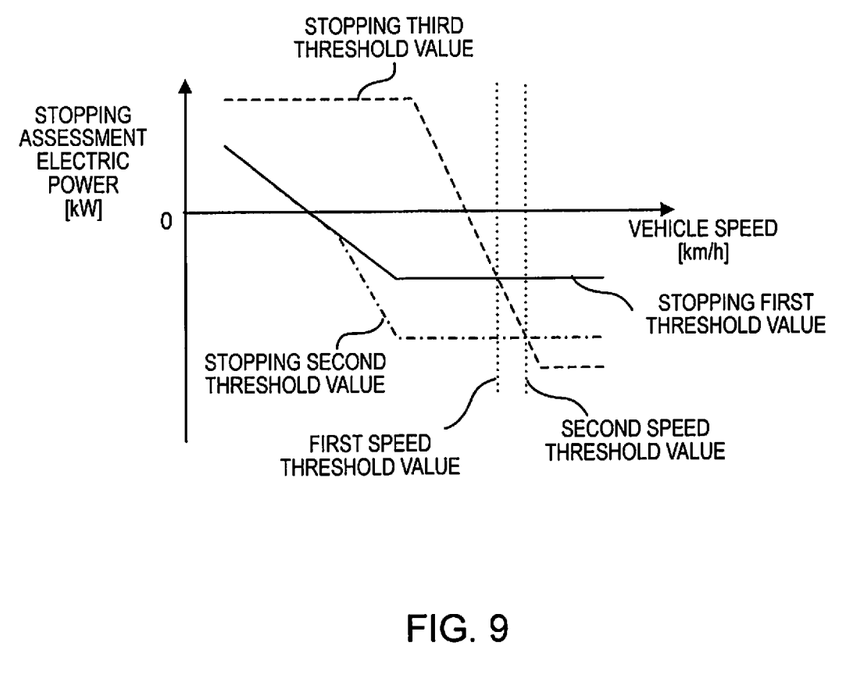
FIG. 9 is a diagram showing stopping threshold values according to a first modification.

FIG. 9 is a diagram that, in the same manner as FIG. 7, shows the stopping first threshold value, the stopping second threshold value, and the stopping third threshold value according to the present modification. The characteristics whereby the threshold values are lower in a high-vehicle-speed region than in a low-vehicle-speed region are the same as in FIG. 7.

In the present modification, within a vehicle-speed region that is lower than a first speed threshold value for a low- or intermediate-vehicle-speed region, the stopping first threshold value is equal to or greater than the stopping second threshold value and is less than the stopping third threshold value. Within a vehicle-speed region that is equal to or greater than a second speed threshold value for a high-vehicle-speed region, the stopping third threshold value is less than the stopping first threshold value and the stopping second threshold value. Specifically, the relationship between the stopping first threshold value and the stopping second threshold value is basically the same as that in the case of FIG. 7, but the stopping third threshold value differs from that in FIG. 7 in being greater than the stopping first threshold value in low- and intermediate-vehicle-speed regions, and being less than the stopping first threshold value in high-vehicle-speed regions. The values of the first speed threshold value and the second speed threshold value can be set in a discretionary manner, and moreover are set as appropriate in accordance with, inter alia, the specifications of the vehicle to which the present modification is applied.

As described above, it is not desirable to allow the internal combustion engine 2 to operate as much as possible in low-vehicle-speed regions; therefore, the stopping third threshold value is set high, making it easier for the internal combustion engine 2 to be stopped. However, because the electric power required in driving the drive motor 4 is high in high-vehicle-speed regions, there is a concern that the state of charge SOC could excessively decrease when the stopping third threshold value is maximized in high-vehicle-speed regions as well. Thus, in high-vehicle-speed regions, the stopping third threshold value is reduced to make it more difficult for the internal combustion engine 2 to be stopped, thereby suppressing any excessive reduction in the state of charge SOC Second Modification A modification pertaining to the startup threshold values and the stopping threshold values is described next. The present modification is also included in the scope of the present invention.

Figure 10:
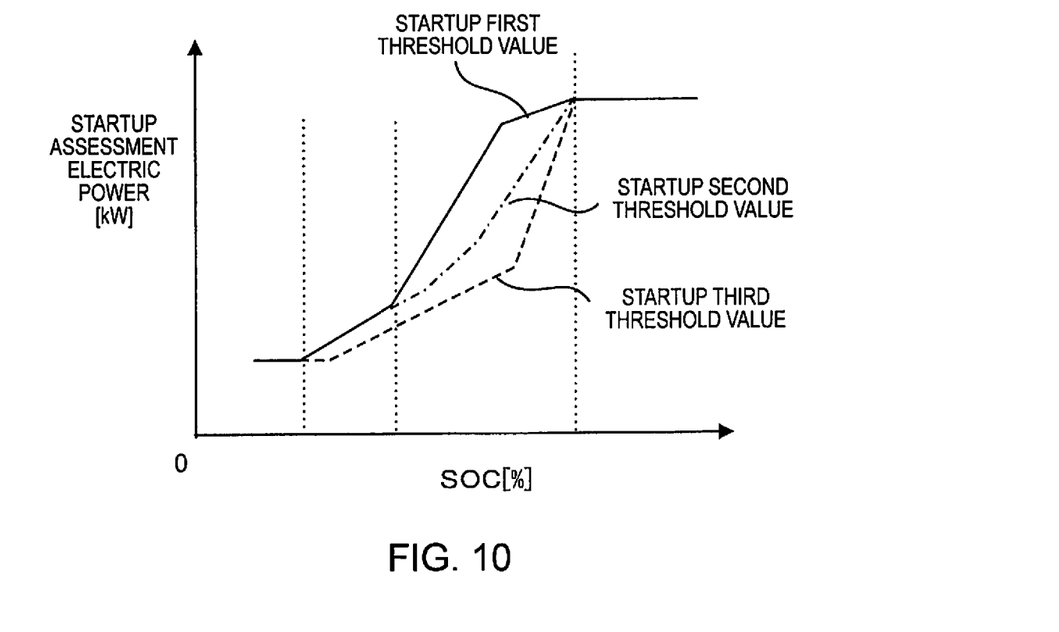
FIG. 10 is a diagram showing startup threshold values according to a second modification.

FIG. 10 is a diagram that shows the relationship between the startup first threshold value, the startup second threshold value, and the startup third threshold value according to the present modification. FIG. 10 differs from FIG. 6 in that the horizontal axis represents the state of charge SOC.

In the embodiment described above, the startup first threshold value, the startup second threshold value, and the startup third threshold value were calculated using a table with the vehicle speed VSP on the horizontal axis; however, it is also possible to use a table with the state of charge SOC on the horizontal axis, as shown in FIG. 10. In this case as well, the startup first threshold value, the startup second threshold value, and the startup third threshold value are all lower at a higher vehicle speed VSP given the same state of charge SOC, in the same manner as in the embodiment described above.

In FIG. 10, essentially, the startup first threshold value is greater than the startup second threshold value, which in turn is greater than the startup third threshold value; however, in a region in which the state of charge SOC is low, the startup first threshold value is equal to the startup second threshold value, and both of these are greater than the startup third threshold value. This relationship is employed in order to make it more difficult for the internal combustion engine 2 to be started up as the regenerative electric power increases, and to suppress any increase in the state of charge SOC in the B position, in the same manner as in a case where the vehicle speed VSP is on the horizontal axis. The boundary between the region in which the startup first threshold value is greater than the startup second threshold value and the region in which the startup first threshold value is equal to the startup second threshold value can be set in a discretionary manner, and moreover can be set as appropriate in accordance with, inter alia, the specifications of the vehicle to which the present modification is applied.

Figure 11:
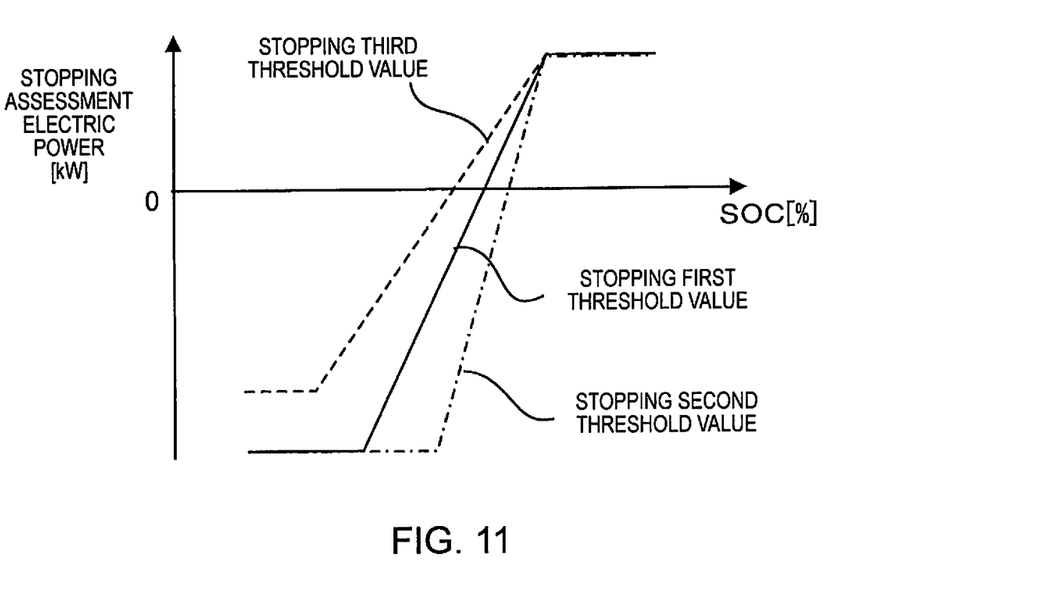
FIG. 11 is a diagram showing stopping threshold values according to the second modification.

FIG. 11 is a diagram that shows the relationship between the stopping first threshold value, the stopping second threshold value, and the stopping third threshold value according to the present modification. FIG. 11 differs from FIG. 7 in that the horizontal axis represents the state of charge SOC.

In the embodiment described above, the stopping first threshold value, the stopping second threshold value, and the stopping third threshold value were calculated using a table with the vehicle speed VSP on the horizontal axis; however, it is also possible to use a table with the state of charge SOC on the horizontal axis, as shown in FIG. 11. In this case as well, the stopping first threshold value, the stopping second threshold value, and the stopping third threshold value are all lower at a higher vehicle speed VSP given the same state of charge SOC, in the same manner as in the embodiment described above.

In FIG. 11, the stopping first threshold value is greater than the stopping second threshold value, and the stopping third threshold value is greater than the stopping first threshold value. The stopping first threshold value is set greater than the stopping second threshold value in order to make it easier for the internal combustion engine 2 to be stopped, and to suppress any increase in the state of charge SOC, to a greater extent when in the B position, in which the regenerative electric power is relatively high, than in the enhanced regeneration mode in the D position, in which regenerative electric power is relatively low. The stopping third threshold value is set greater than the stopping first threshold value because regenerative electric power is low in the normal regeneration mode in the D position in which the stopping third threshold value is used, therefore substantially eliminating the chance that the vehicle requested output will fall below the threshold value when a rather low threshold value is set.

Third Modification

A modification pertaining to the vehicle requested output is described next. The present modification is also included in the scope of the present invention.

In the embodiment described above, the target drive electric power is used as the vehicle requested output, and assessments as to starting up and stopping the internal combustion engine 2 are made by comparing the target drive electric power and the threshold values. However, in the present modification, the target drive force DP_T is used as the vehicle requested output, and the assessments as to starting up and stopping the internal combustion engine 2 are made by comparing the target drive force DP_T and the threshold values.

The target drive electric power is the electric power required by the drive motor 4 in order to realize the target drive force DP_T. Therefore, in can be said that the target drive electric power is obtained and outputted by converting the target drive force DP_T to a target torque of the drive motor 4, converting the current vehicle speed VSP to a rotational speed of the drive motor 4, and then multiplying the resultant target torque and rotational speed. Specifically, it can be said that the target drive force DP_T is substantially the same as the target drive electric power.

In association with changing the vehicle requested output from the target drive electric power to the target drive force DP_T, it is necessary to change the startup threshold values and the stopping threshold values from threshold values for electric power to threshold values for drive force. In the present modification, there are used threshold values obtained by converting the startup threshold values and the stopping threshold values in the embodiment and the modifications described above from electric power to drive force. Specifically, it can be said that the startup threshold values and stopping threshold values in the present modification, and the startup threshold values and stopping threshold values in the embodiment and modifications described above, are substantially the same. Therefore, the startup threshold values and the stopping threshold values in the present modification also have the characteristics shown in FIGS. 6, 7, and 9-11.

As described above, the same effects as in the embodiment described above can also be obtained in cases where the target drive electric power is used as the vehicle requested output.

Effect of the Invention

In the present embodiment, there is provided a method for controlling a series hybrid vehicle in which: a battery 5 is charged with electric power generated by an electric power generation motor 3, which is driven by motive power from an internal combustion engine 2, and with electric power regenerated by a drive motor 4, the electric power of the battery 5 being used in driving of drive wheels by the drive motor 4; generation of electric power by the internal combustion engine 2 is started if a vehicle requested output exceeds a startup threshold value (electric power generation start threshold value), and generation of electric power by the internal combustion engine 2 is stopped if the vehicle requested output falls below a stopping threshold value (electric power generation stop threshold value); and a deceleration rate produced through regeneration of the drive motor is greater in the B position (second advancement shift position) than in the D position (first advancement shift position). The regeneration of the drive motor mentioned here is performed in a state where the accelerator pedal is off. In this control method, the startup threshold value and/or the stopping threshold value in a case where B has been selected is greater than the respective startup threshold value or stopping threshold value in a case where D has been selected.

Thus, the frequency with which a requested drive force (or requested electric power) exceeds the startup threshold value and generation of electric power is started during acceleration prior to the start of deceleration (e.g., timings T2 to T3 in FIG. 8) decreases, and any increase in the state of charge SOC is suppressed. In addition, the frequency with which the requested drive force (or requested electric power) falls below the stopping threshold value and electric power generation is started during deceleration or during constant-speed travel (e.g., timings T1 to T2 in FIG. 8, or subsequent to timing T3 in FIG. 8) increases, and any increase in the state of charge SOC is suppressed. As a result, regenerative electric power is restricted, thereby making it possible to reduce the frequency with which a deceleration rate changes. Specifically, it is possible to reduce the frequency with which the deceleration rate changes during deceleration.

In the present embodiment, the D position is provided with a normal regeneration mode, and an enhanced regeneration mode in which the deceleration rate produced through regeneration of the drive motor is greater than that in the normal regeneration mode and is less than that in the B position. The startup threshold value in the D position in the enhanced regeneration mode (startup second threshold value) is greater than the startup threshold value in the D position in the normal regeneration mode (startup third threshold value), and the startup threshold value in the B position (startup first threshold value) is greater than the startup third threshold value. This makes it more difficult for the internal combustion engine 2 to start up as the regenerative electric power increases.

In the present embodiment, in a case where a state of charge SOC of the battery 5, which is charged with electric power generated by the electric power generation motor 3, is greater than a threshold value, the startup threshold value in the B position is greater than the startup threshold value in both the enhanced regeneration mode and the normal regeneration mode in the D position. In a case where the state of charge SOC is equal to or less than the threshold value, the startup threshold value in the B position is greater than the startup threshold value in the normal regeneration mode in the D position, and is equal to that in the enhanced regeneration mode in the D position. Thus, when the state of charge SOC is low, generation of electric power by the internal combustion engine 2 is performed at the same frequency in the B position as in the enhanced regeneration mode in the D position, therefore making it possible to suppress any excessive decrease in the state of charge SOC in the B position.

In the present embodiment, the stopping threshold value and the deceleration rate produced through regeneration of the drive motor 4 are greater in the B position than in the enhanced regeneration mode in the D position. This makes it easier for the internal combustion engine 2 to be stopped and makes it possible to suppress any increase in the state of charge SOC in the B position, in which regenerative electric power is high, and also makes it possible to reduce the frequency with which regenerative electric power is restricted. As a result, it is possible to reduce the frequency with which the deceleration rate changes due to restrictions on the regenerative electric power partway through deceleration, and to satisfy the deceleration rate requested by a driver.

In the present embodiment, in a case where a vehicle speed is equal to or less than a first speed threshold value, the stopping threshold value in the B position is equal to or greater than that in the enhanced regeneration mode in the D position, and is less than that in the normal regeneration mode in the D position. In a case where the vehicle speed is equal to or greater than a second speed threshold value having a magnitude that is equal to or greater than that of the first speed threshold value, the stopping threshold value in the normal regeneration mode in the D position is less than that in the B position and also is less than that in the enhanced regeneration mode in the D position. Because the electric power required for driving is high in cases where the vehicle speed is high, making it more difficult for the internal combustion engine 2 to be stopped in the normal regeneration mode in the D position, in which the regenerative electric power is low, as described in the present embodiment makes it possible to suppress any excessive decrease in the state of charge SOC.

Although an embodiment of the present invention is described above, this embodiment merely illustrates a portion of an application example of the present invention, and is not intended to limit the technical scope of the present invention to the specific configuration in the embodiment described above.

The invention claimed is:

1. A series hybrid vehicle control method comprising:
charging a battery with electric power generated by an electric power generation motor that is driven by motive power from an internal combustion engine, and driving a drive wheel with a drive motor using the electric power of the battery and the electric power regenerated by the drive motor;
starting generation of the electric power by the internal combustion engine if a vehicle requested output exceeds an electric power generation start threshold value, and stopping generation of electric power by the internal combustion engine if the vehicle requested output falls below an electric power generation stop threshold value; and
producing a deceleration rate through regeneration of the drive motor that is greater in a second advancement shift position than in a first advancement shift position,
wherein at least one of the electric power generation start threshold value and the electric power generation stop threshold value in a case where the second advancement shift position has been selected is greater than a respective one of the electric power generation start threshold value or the electric power generation stop threshold value in a case where the first advancement shift position has been selected.

2. The series hybrid vehicle control method according to claim 1, wherein
the first advancement shift position is provided with a normal regeneration mode, and an enhanced regeneration mode in which the deceleration rate produced through regeneration of the drive motor is greater than that in the normal regeneration mode and is less than that in the second advancement shift position, and
the electric power generation start threshold value in the first advancement shift position in the enhanced regeneration mode is greater than the electric power generation start threshold value in the first advancement shift position in the normal regeneration mode.

3. The series hybrid vehicle control method according to claim 2, wherein in a case where a state of charge of the battery is greater than a threshold value, the electric power generation start threshold value in the second advancement shift position is greater than the electric power generation start threshold value in both the enhanced regeneration mode and the normal regeneration mode in the first advancement shift position and in a case where the state of charge of the battery is equal to or less than the threshold value, the electric power generation start threshold value in the second advancement shift position is greater than the electric power generation start threshold value in the normal regeneration mode in the first advancement shift position, and is equal to that in the enhanced regeneration mode in the first advancement shift position.

4. The series hybrid vehicle control method according to claim 2, wherein the electric power generation stop threshold value and the deceleration rate produced through regeneration of the drive motor are greater in the second advancement shift position than in the enhanced regeneration mode in the first advancement shift position.

5. The series hybrid vehicle control method according to claim 2, wherein in a case where a vehicle speed is equal to or less than a first speed threshold value, the electric power generation stop threshold value in the second advancement shift position is equal to or greater than that in the enhanced regeneration mode in the first advancement shift position, and is less than that in the normal regeneration mode in the first advancement shift position; and in a case where the vehicle speed is equal to or greater than a second speed threshold value having a magnitude that is equal to or greater than that of the first speed threshold value, the electric power generation stop threshold value in the normal regeneration mode in the first advancement shift position is less than that in the second advancement shift position and also is less than that in the enhanced regeneration mode in the first advancement shift position.

6. A series hybrid vehicle comprising:

an internal combustion engine;

an electric power generation motor that is driven by motive power of the internal combustion engine to generate electric power;

a drive motor that uses electric power of the electric power generation motor in driving of a drive wheel;

a battery that is charged with electric power generated by the electric power generation motor and electric power regenerated by the drive motor; and a controller that starts generation of electric power by the internal combustion engine if a vehicle requested output exceeds an electric power generation start threshold value, stops generation of electric power by the internal combustion engine if the vehicle requested output falls below an electric power generation stop threshold value, and increases the deceleration rate produced through regeneration of the drive motor to a greater extent in a second advancement shift position than in a first advancement shift position, wherein at least one of the electric power generation start threshold value and the electric power generation stop threshold value in a case where the second advancement shift position has been selected is greater than a respective one of the electric power generation start threshold value or electric power generation stop threshold value in a case where the first advancement shift position has been selected.

* * * * *